(12) United States Patent
Doerr et al.

(10) Patent No.: US 7,450,801 B2
(45) Date of Patent: Nov. 11, 2008

(54) APPARATUS FOR FREE-SPACE SWITCHING BETWEEN PLANAR LIGHTWAVE CIRCUITS

(75) Inventors: Christopher Richard Doerr, Middletown, NJ (US); Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/925,261

(22) Filed: Aug. 24, 2004

(65) Prior Publication Data

US 2006/0045420 A1    Mar. 2, 2006

(51) Int. Cl.
*G02B 6/32* (2006.01)
*G02B 6/26* (2006.01)
*G02B 6/42* (2006.01)

(52) U.S. Cl. .............................. 385/33; 385/16; 385/18; 385/31; 385/39; 385/47; 385/50

(58) Field of Classification Search ..................... 385/33
See application file for complete search history.

(56) References Cited

U.S. PATENT DOCUMENTS 6,268,952 B1 * 7/2001 Godil et al. ................. 359/291
6,657,770 B2 * 12/2003 Marom et al. ............... 359/290
6,757,458 B2   6/2004 Neilson et al. ............... 385/18
2002/0163942 A1 * 11/2002 Baillargeon et al. ........... 372/20
2004/0151432 A1 *  8/2004 Tabuchi et al. ................ 385/37

OTHER PUBLICATIONS

T. Ducellier et al., "Novel High Performance Hybrid Waveguide-MEMS 1×9 Wavelength Selective Switch In A 32-Cascade Loop Experiment", *ECOC 2004 Proceedings*—Post-Deadline, Paper Th4.2.2.

R. Ryf et al., "Scalable Wavelength Selective Crossconnect Switch Based On MEMS And Planar Waveguides", 27th European Conference on Optical Communications, 2001, vol. 6, Sep. 30-Oct. 4, 2001, pp. 76-77.

* cited by examiner

*Primary Examiner*—Frank Font
*Assistant Examiner*—Ryan Lepisto (57) ABSTRACT

A free-space optical switch for switching light beams between waveguides of planar lightwave circuits (PLCs). Switching is accomplished using a combination of lenses and micromirrors. The lenses and the controlled tilt of the micromirrors can establish a one-to-one interconnection path between waveguides of the PLCs.

20 Claims, 10 Drawing Sheets

APPARATUS FOR FREE-SPACE SWITCHING BETWEEN PLANAR LIGHTWAVE CIRCUITS

BACKGROUND OF THE INVENTION

1. Technical Field

The present invention relates to free space optical switching, and more particularly to apparatus for switching optical signals between waveguides of planar lightwave circuits.

2. Description of the Related Art

Free-space micro electromechanical systems (MEMS) optical switches have been found to offer a number of advantages including high port count, low insertion loss, low crosstalk, optical transparency, and polarization insensitivity. However, practical application of prior art switch designs is often limited because of alignment issues, assembly issues, and size issues due to the bulk optical elements and long free-space propagation distances.

Planar lightwave circuits (PLCs) have proven to be a convenient platform for fabricating components of lightwave communication systems. PLCs offer the advantages of precise manufacturing, small form factor, simple packaging and thermal stabilization.

Compact optical switches can be realized by combining MEMS devices and PLCs. Prior art MEMS-PLC based optical switch designs, however, typically only offer small port counts (1×2 or 2×2) without cascading multiple switches (which raises crosstalk and loss issues), or employ complex designs requiring the use of multiple mirrors in the optical signal path, which gives rise to manufacturing and alignment issues.

BRIEF SUMMARY OF THE INVENTION

The present invention provides free-space switching solutions between waveguides of multiple PLCs using tilting micromirrors. Each PLC has one or more waveguides that terminate at an edge facet of the PLC. Switching between the waveguides of the PLCs is accomplished using a combination of lenses and a single micro electromechanical systems (MEMS) micromirror or linear array of MEMS micromirrors. The tilt of the micromirrors can establish a one-to-one interconnection path between waveguides of the PLCs.

The disclosed embodiments provide relatively low cost, effective MEMS-PLC based optical switches, which resolve many of the size, packaging, alignment and stability issues of the prior art. The various embodiments of the invention include different lens/micromirror combinations that provide vertical direction interconnection, localized region interconnection, or a single interconnection from one waveguide to any other waveguide of the PLCs.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown.

In the drawings.

DETAILED DESCRIPTION OF THE INVENTION

Figure 1:
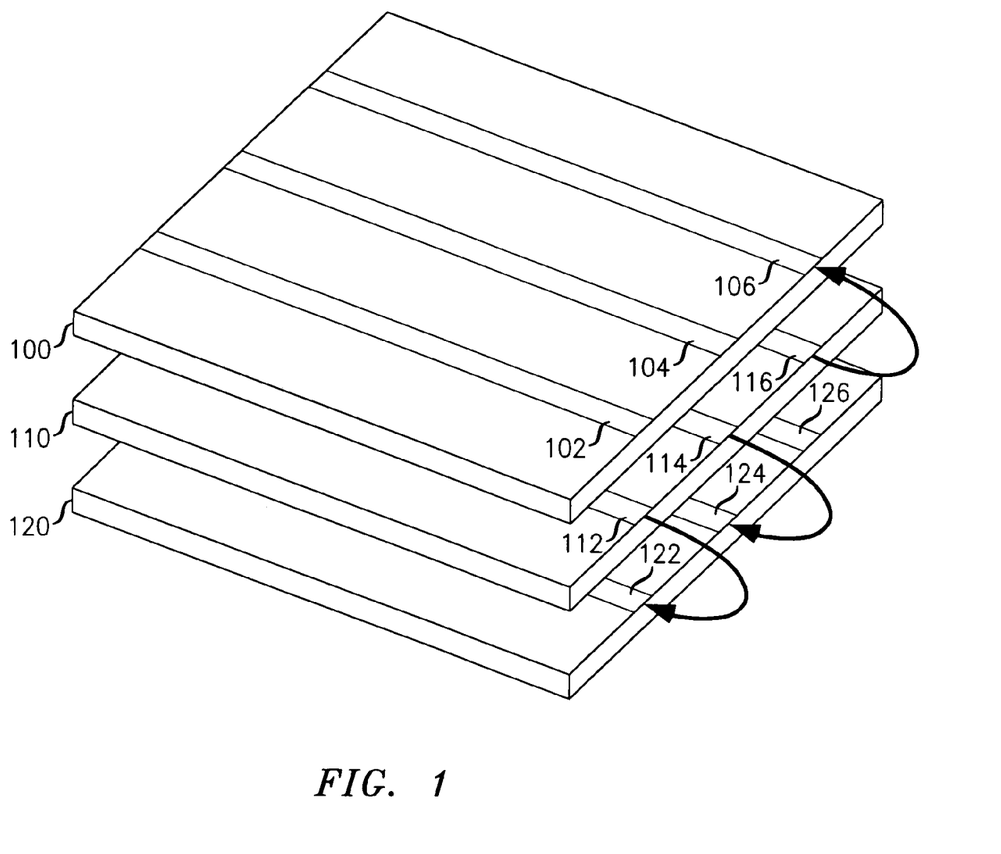
FIG. 1 is an illustration showing a stacked arrangement of planar lightwave circuits.

The present invention provides an apparatus for free-space switching between waveguides of a plurality of PLCs. As can be understood from FIG. 1, which depicts three PLCs 100, 110 and 120 in a stacked arrangement including a plurality of waveguides, 102, 104, 106, 112, 114, 116, 122, 124, 126, light emitted from one of the waveguides (referred to hereinafter as "light beams") can be redirected back into a desired waveguide. For example, light beams emitted from any waveguide (e.g. 112, 114, or 116) on any PLC can be redirected to any other waveguide (e.g. 122, 124, or 106, respectively) on any PLC.

Figure 2A:
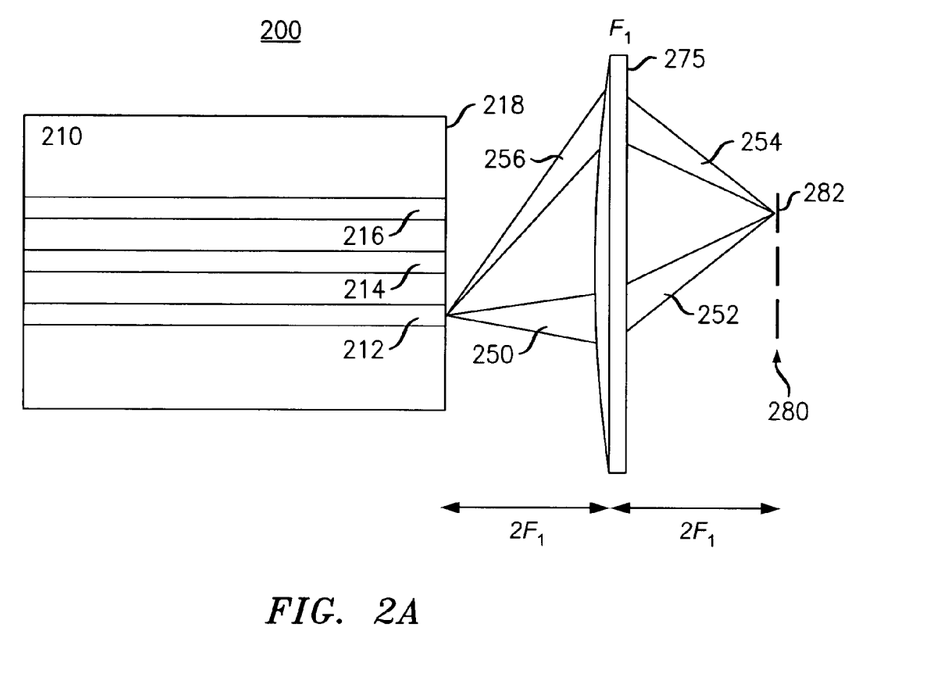
FIGS. 2a-b are top and side views of an optical switch according to one embodiment of the invention.
Figure 2B:
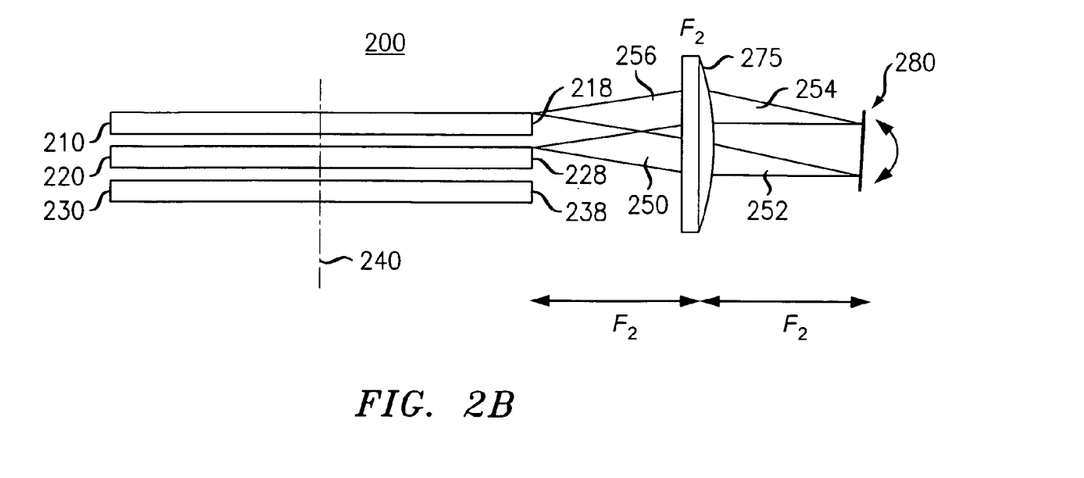

In one preferred embodiment, an optical switch apparatus 200, shown in FIGS. 2a-b, is provided, which comprises a plurality of PLCs 210, 220, 230, a lens 275, and an array of tilting micromirrors 280.

The plurality of PLCs 210, 220, 230 shown in the illustrated embodiment are arranged in a stacked configuration. It will be appreciated by those skilled in the art that, alternatively, any number of PLCs can be arranged in a variety of configurations in accordance with the present invention for switching light beams between waveguides of the PLCs.

Each PLC 210, 220, 230 has one or more waveguides (e.g. 212, 214, 216, hereinafter referred to collectively as "the waveguides") that terminate at an edge facet 218, 228, 238 of the PLC. The edge facets 218, 228, 238 are preferably anti-reflection coated to reduce loss and prevent back reflection.

The PLCs 210, 220, 230 are preferably arranged in a stack such that the waveguides are aligned for vertical switching. Specifically, in preferred embodiments at least some of the waveguides of the stacked PLCs 210, 220, 230 are substantially aligned relative to a vertical axis (e.g. axis 240) of the stacked PLCs 210, 220, 230 to facilitate switching between vertically aligned waveguides.

It is to be understood that the terms "horizontal" and "vertical" are used herein in discussing the preferred embodiments for reference purposes only and are not intended to limit the scope of the claimed invention.

As can be understood from FIGS. 2a-b, a light beam (e.g. light beam 250) emitted from a waveguide on PLC 220 (e.g. the waveguide below waveguide 212), radiates normally to the edge facet 228 into free space and through a lens 275 in the path of the light beam. The lens 275 collimates the light beam in a vertical direction and images the light beam in a horizontal direction (e.g. as light beam 252).

The lens 275 is preferably an anamorphic lens constructed from two crossed cylindrical lenses, having different focal lengths; $F_1$ in a horizontal direction and $F_2$ in a vertical direction, where $2F_1=F_2$. The anamorphic lens 275 is preferably positioned between the PLCs 210, 220, 230 and the micromirror array 280, at a distance of $2F_1$ (or $F_2$) from each of the PLCs 210, 220, 230 and the micromirror array 280. It can be understood by those skilled in the art from FIG. 2a that the anamorphic lens 275 can alternatively be constructed from a spherical lens and a cylindrical lens having focal lengths as discussed above.

The light beam (252) is imaged onto a micromirror (e.g. micromirror 282) of the micromirror array 280. The micromirror (282), like all mirrors in the micromirror array 280, can be tilted or rotated about an axis to direct beams at a desired angle and in a preferred direction. The light beam 252 is reflected and directed by the micromirror (e,g, as light beam 254) through the lens 275, which images the beam (e.g. as light beam 256) onto the edge facet 218 of a waveguide 212 of PLC 210, and couples the light beam (256) into the waveguide (e.g. waveguide 212). As FIG. 2a illustrates (in a somewhat exaggerated manner), the light beam 256 coupling into the waveguide 212 is not normal to the edge facet 218, which results in some coupling loss. This issue is addressed below with reference to other embodiments of the invention.

Figure 3A:
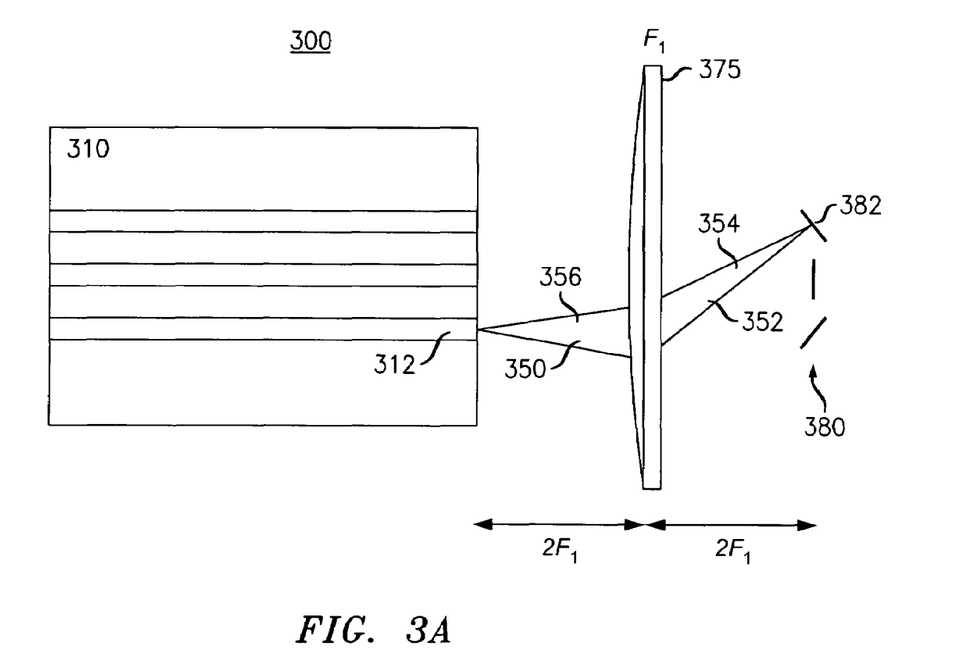
FIGS. 3a-b are top and side views of an optical switch according to another embodiment of the invention.
Figure 3B:
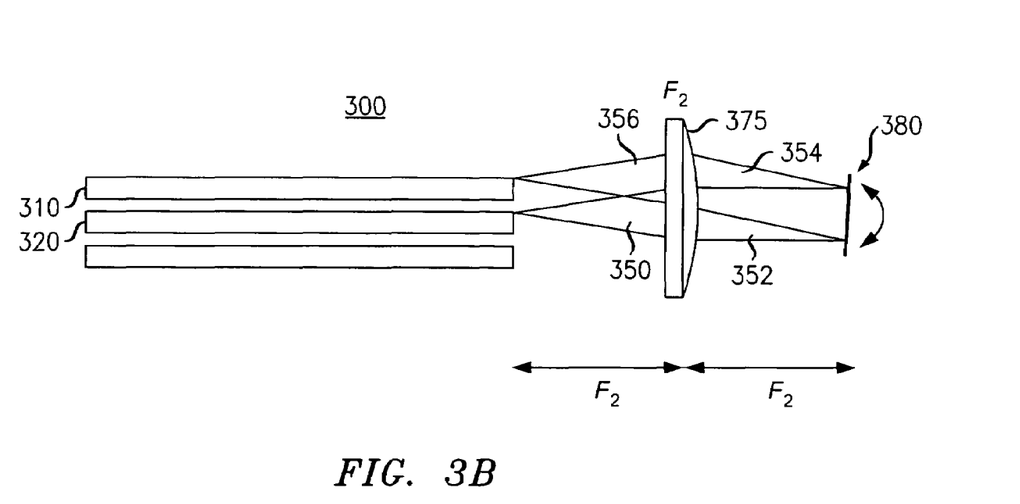

FIGS. 3a-b illustrate an alternative embodiment of an optical switch 300 according to the present invention. As can be understood from FIGS. 3a-b, micromirrors (e.g. micromirror 382) of the micromirror array 380 are capable of tilting about two axes such that, for example, a light beam (e.g. light beam 350) emitted from a waveguide on a PLC (e.g. the waveguide below waveguide 312 on PLC 320), can be imaged by a lens 375 (e.g. as light beam 352) onto micromirror (e.g. micromirror 382) and reflected back through the lens 375 (e.g. as light beam 354) to be imaged onto a waveguide (e.g. waveguide 312 on PLC 310) as a normally incident light beam (e.g. light beam 356), for effective coupling into the waveguide (312). Preferably, the lens 375 is an anamorphic lens constructed from two crossed cylindrical lenses (or alternatively, a spherical lens and a cylindrical lens), having different focal lengths; $F_1$ in a horizontal direction and $F_2$ in a vertical direction, where $2F_1=F_2$.

Figure 4A:
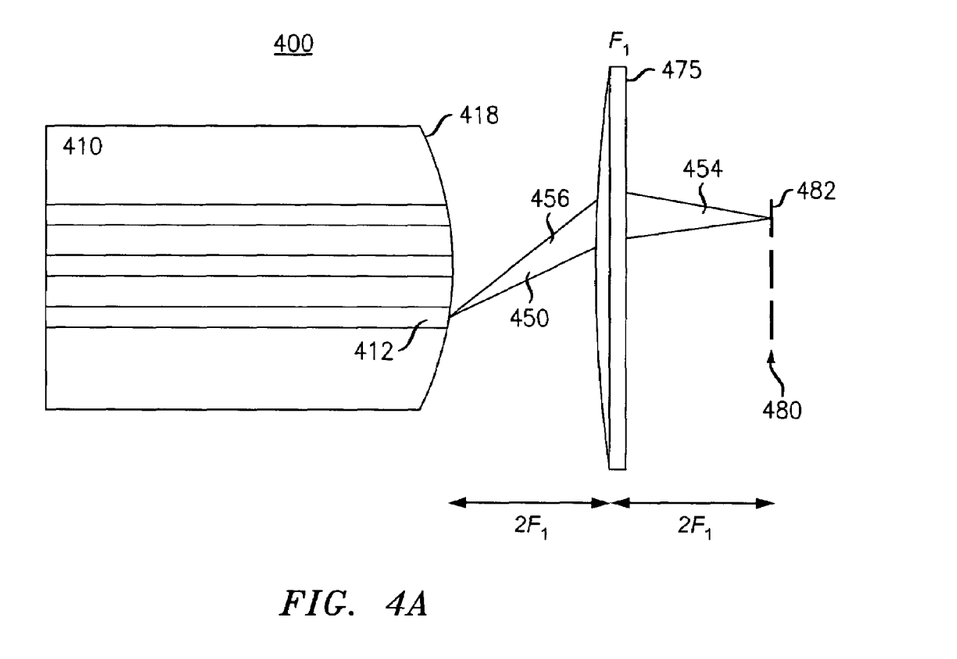
FIGS. 4a-b are top and side views of an optical switch according to another embodiment of the invention.
Figure 4B:
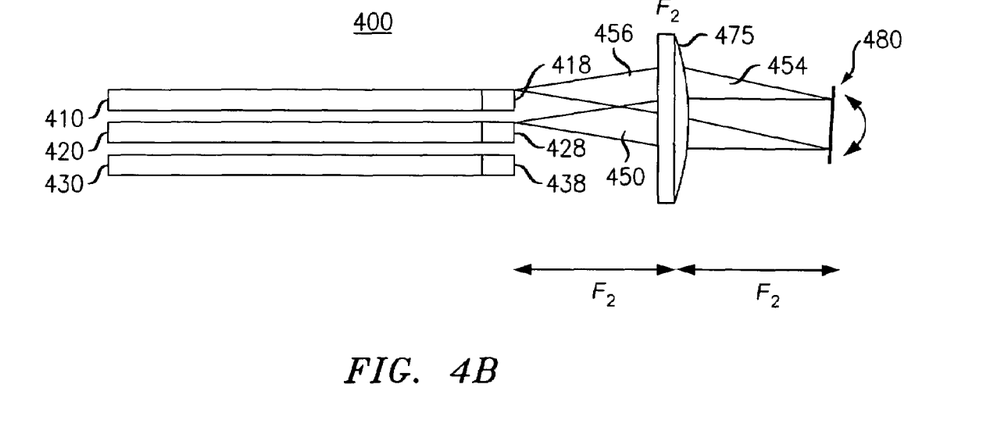

In another alternative embodiment, shown in FIGS. 4a-b, an optical switch 400 is provided wherein the edge facets 418, 428, 438 of PLCs 410, 420, 430 are formed (e.g. polished) to have a curved profile. The curved profile of the edge facets 418, 428, 438 intersects the waveguides of the PLCs 410, 420, 430 causing light beams radiating from the waveguides to radiate at an angle (due to refraction at the boundary between the waveguide and free space). For example, a light beam 450 emitted from a waveguide on PLC 420 (e.g. the waveguide below waveguide 412) is imaged by a lens 475 to strike a micromirror 482 normally, reflect back as light beam 454 through the lens 475 and efficiently couple into waveguide 412 of PLC 410, as light beam 456. This arrangement only requires the micromirrors of the micromirror array 480 to tilt about one axis to vertically switch light between waveguides of the PLCs 410, 420, 430. As discussed above with reference to other embodiments, the lens 475 is preferably an anamorphic lens constructed from two crossed cylindrical lenses (or alternatively, a spherical lens and a cylindrical lens), having different focal lengths; $F_1$ in a horizontal direction and $F_2$ in a vertical direction, where $2F_1=F_2$.

Figure 5A:
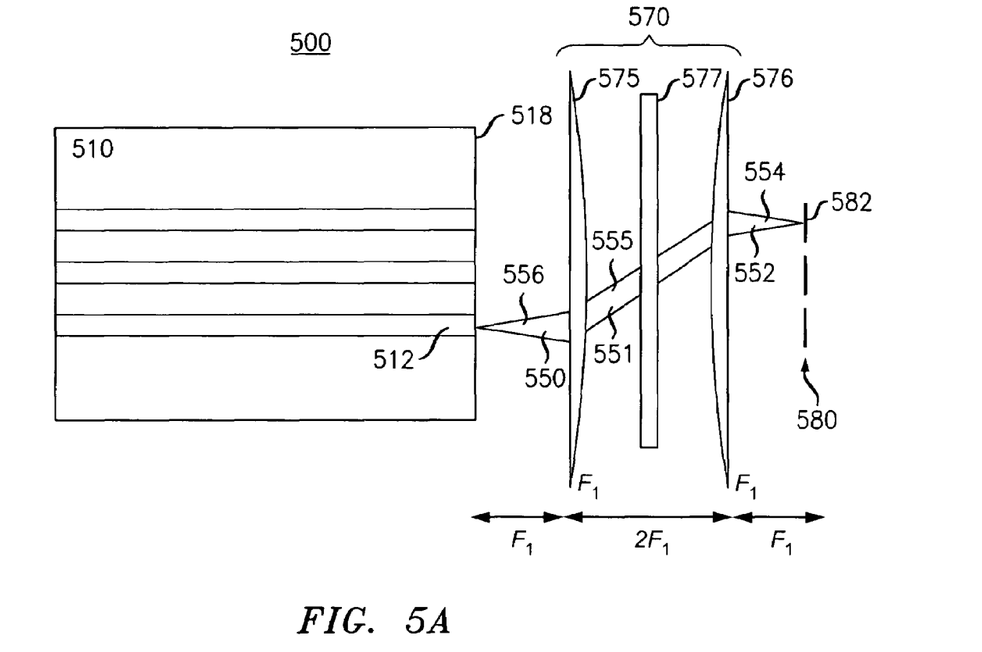
FIGS. 5a-b are top and side views of an optical switch according to another embodiment of the invention.
Figure 5B:
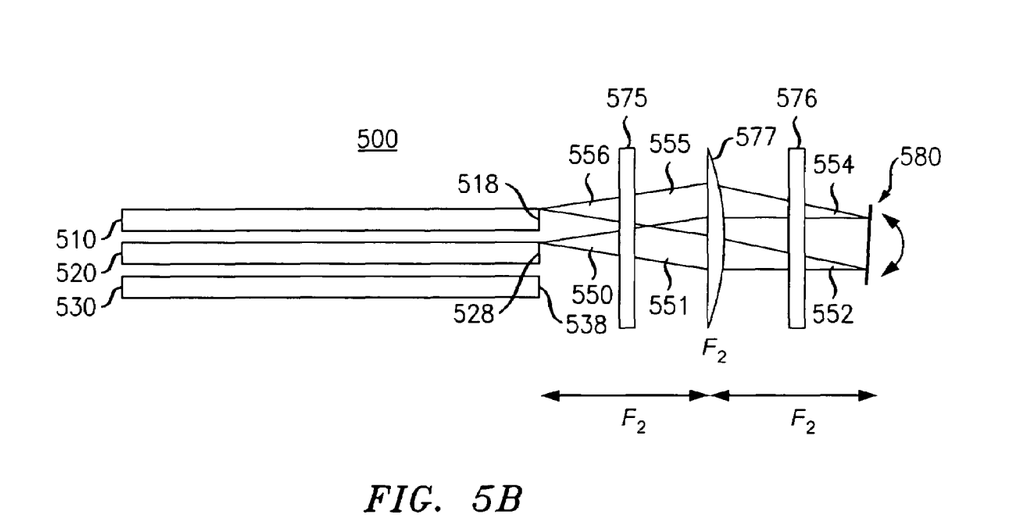

In another alternative embodiment of an optical switch 500 according to the invention (shown in FIGS. 5a-b), an imaging system 570 is used so that light beams each strike a micromirror of a micromirror array 580 and an edge facet 518, 528, 538 of a PLC 510, 520, 530 normally. The imaging system 570 preferably comprises three lenses 575, 576, 577. In the horizontal direction, the optical system 570 effectively comprises a telecentric imaging system (two lenses 575 and 576, each of focal length $F_1$), such that a light beam (e.g. light beam 550) emitted from a waveguide on a PLC (e.g. the waveguide below waveguide 512 on PLC 520), is collimated (e.g. as light beam 551) between the lenses 575, 576, and is imaged normally (e.g. as light beam 552) on a micromirror (e.g. micromirror 582). In the vertical direction, the optical system 570 collimates the light beam (550) onto a micromirror (582) using a cylindrical lens 577 of focal length $F_2$. Light beams are reflected off of a micromirror (e.g. as light beam 554) and through the imaging system 570 (e.g. as collimated light beam 555 between the lenses 575, 576), and efficiently couple into a waveguide (e.g. waveguide 512 of PLC 510, as light beam 556). The micromirrors (e.g. micromirror 582) only need to pivot about a single axis to switch light beams to another vertically aligned waveguide (e.g. between the waveguide below waveguide 512 on PLC 520 and waveguide 512 on PLC 510).

In another alternative embodiment of an optical switch 600 according to the invention (shown in FIGS. 6a-b), each of the waveguides on the PLCs 610, 620, 630 include a mode conversion region 601, preferably positioned adjacent to the edge facets 618, 628, 638 of the PLCs 610, 620, 630, where each of the waveguides broadens adiabatically. These mode conversion regions 601 of the waveguides cause light beams to emerge from the waveguides in an elliptic mode such that the numerical aperture (NA) in the vertical direction is high relative to the NA in the horizontal direction (i.e. a light beam emitted from a waveguide rapidly diverges in the vertical direction and slowly diverges in the horizontal direction, relatively). Since the beam is slowly diverging in the horizontal direction, no imaging operation is needed for the horizontal component. Due to the slow divergence in the horizontal direction, the beam propagates in free space, strikes the mirror, reflects back to the PLC and efficiently couples into the waveguide.

Figure 6A:
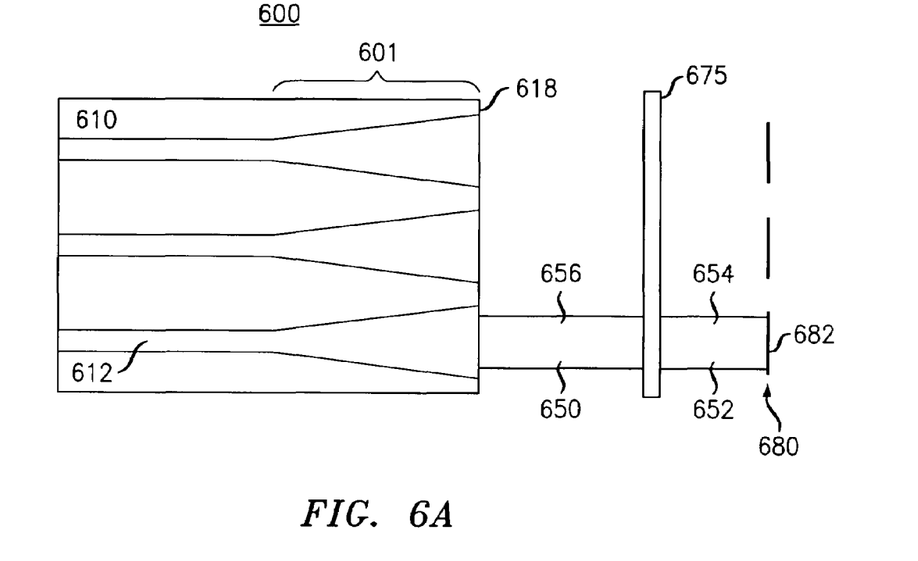
FIGS. 6a-b are top and side views of an optical switch according to another embodiment of the invention.
Figure 6B:
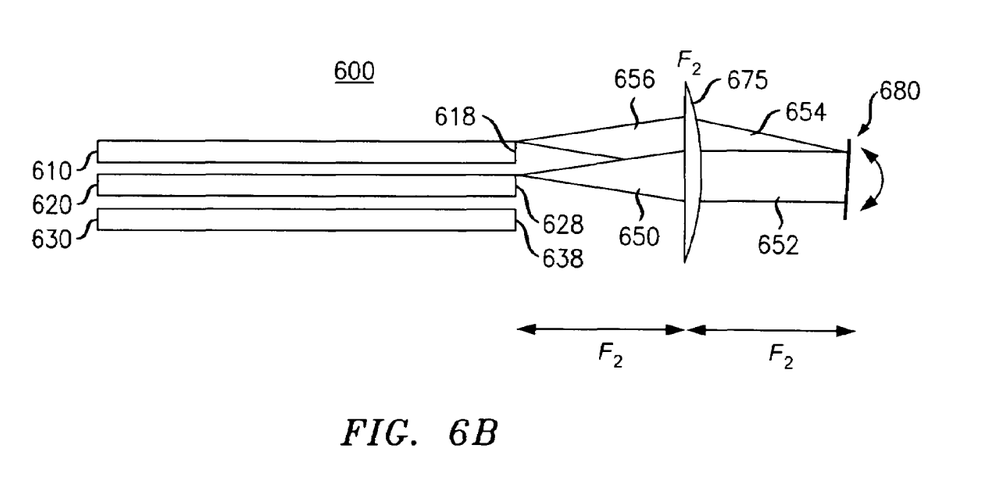

In operation, for example, a light beam 650 emitted from a waveguide on PLC 620 (i.e., the waveguide below waveguide 612), radiates from the PLC 620 and diverges in the vertical direction. The light beam 650 passes through a lens 675, which collimates the light beam 650 in the vertical direction (as light beam 652). The light beam 652 strikes a micromirror 682 of the micromirror array 680. The micromirrors (e.g.682) of the micromirror array 680 can be tilted or rotated about an axis to direct beams at a desired angle and in a preferred direction. The light beam 652 is reflected and directed by the micromirror (as light beam 654) through the lens 675, which images the light beam 656 in a vertical direction onto the edge facet 618 of waveguide 612 of PLC 610, and couples the light beam 656 into the waveguide 612.

In another alternative embodiment of an optical switch 700 according to the invention (shown in FIGS. 7a-b), each of the waveguides of the PLCs 710, 720, 730 include a mode conversion region 701, preferably positioned adjacent to the edge facets 718, 728, 738 of the PLCs 710, 720, 730, where each of the waveguides broadens adiabatically. The edge facets 718, 728, 738 are preferably formed with curved, cylindrical lenslike profiles in a horizontal direction. The mode conversion regions 701 and the curved profiles of the edge facets 718, 728, 738 cause a beam emitted from the waveguides to have a converging mode in a horizontal direction, focusing the beam on the micromirrors.

Figure 7A:
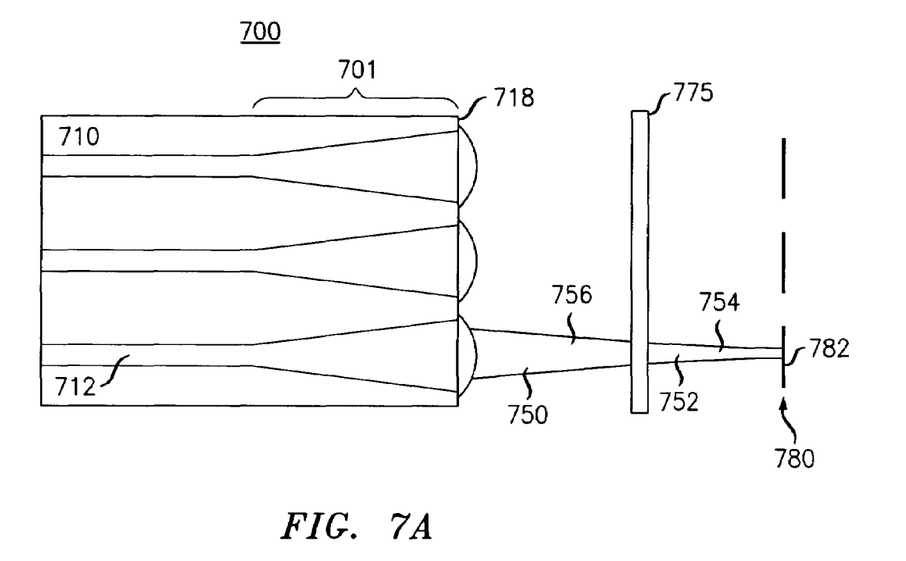
FIGS. 7a-b are top and side views of an optical switch according to another embodiment of the invention.
Figure 7B:
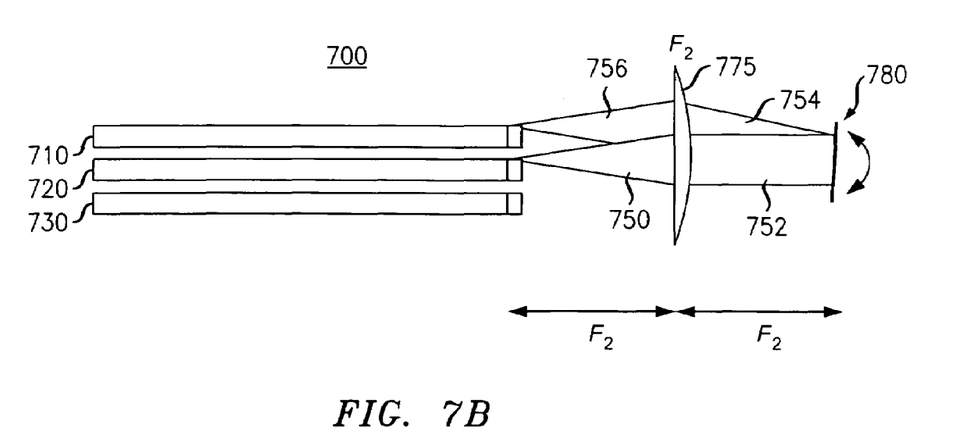

In operation, for example, a light beam 750 emitted from a waveguide on a PLC 720 (i.e., the waveguide below waveguide 712), radiates from the PLC 720 and diverges in a vertical direction, while converging in the horizontal direction. The light beam 750 passes through a cylindrical lens 775, which collimates the light beam 750 in the vertical direction (as light beam 752). The light beam 752 strikes a micromirror 782 of micromirror array 780. The micromirrors of micromirror array 780 can be tilted or rotated about an axis such that light beams (e.g light beams 752) are reflected and directed by the micromirror (e.g. as light beam 754) through the lens 775. The lens 775 images the light beam 754 (as light beam 756) in the vertical direction onto the edge facet 718 of another PLC 710, and couples the light beam 756 into a waveguide 712. Alternatively, the edge facets 718, 728, 738 can be formed with curved profiles such that a beam emitted from the waveguides is collimated in a horizontal direction.

Figure 8A:
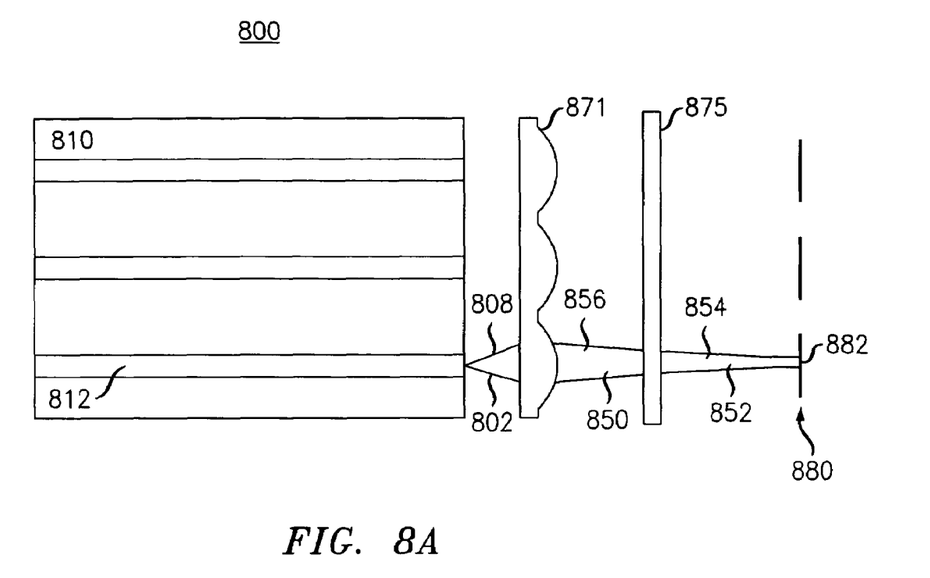
FIGS. 8a-b are top and side views of an optical switch according to another embodiment of the invention.
Figure 8B:
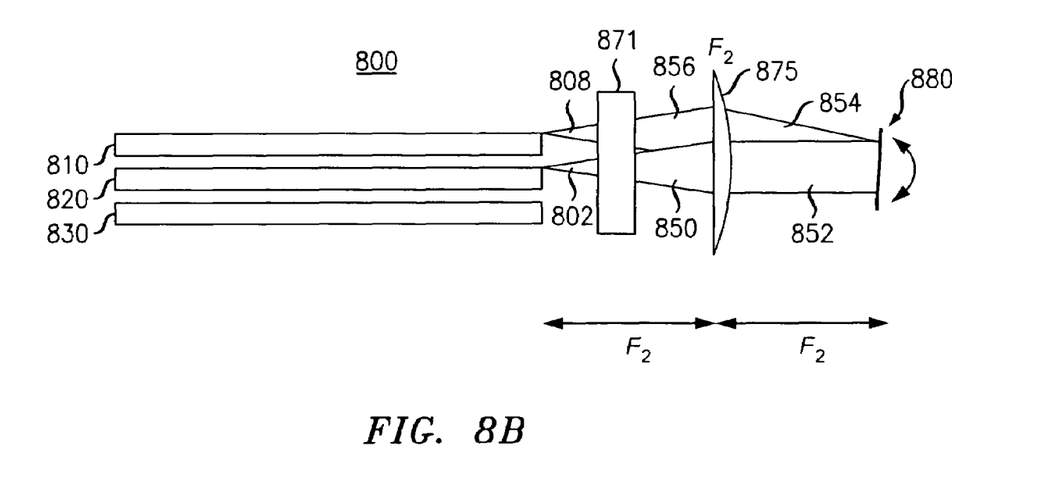

In another alternative embodiment of an optical switch 800 according to the invention (shown in FIGS. 8a-b), a cylindrical lens array 871 is positioned adjacent the plurality of PLCs 810, 820, 830 to cause light beams (e.g. light beam 802 from PLC 820) emitted from waveguides on the PLCs 810, 820, 830 to converge in a horizontal direction (e.g. as light beams 850, 852), as similarly discussed with regard to the embodiments of FIGS. 7a-b. The light beams (e.g. light beam 802) emitted from the PLCs 810, 820, 830 are collimated in a vertical direction by a cylindrical lens 875 such that the light beams strike a micromirror (e.g. micromirror 882) of the micromirror array 880. The micromirrors of the micromirror array 880 can be tilted or rotated about an axis such that light beams (e.g. 854, 856) are reflected and directed by the micromirrors through the lens 875 and the cylindrical lens array 871. The lens 875 and the cylindrical lens array 871 image the light beams in the vertical and horizontal directions, respectively (e.g. as light beam 808), onto an edge facet of a PLC 810, 820, 830, coupling the light beams into waveguides (e.g. waveguide 812) on a PLC 810, 820, 830.

Those skilled in the art will appreciate that the switching functionality of the present invention is not limited to the vertical direction. Various modifications can be made which allow for switching between waveguides on a single PLC, between groups of waveguides on one or more PLCs, etc. For example, in an optical switch 900 according to another embodiment of the invention shown in FIGS. 9a-b, an array of spherical lenses 975 is placed near the edge facets 918, 928, 938 of the plurality of PLCs 910, 920, 930. Preferably, the aperture of each lens in the array of spherical lenses 975 covers a subset of the waveguides (e.g. 912, 914, etc. or 916, 917, etc) on the PLCs 910, 920, 930.

Figure 9A:
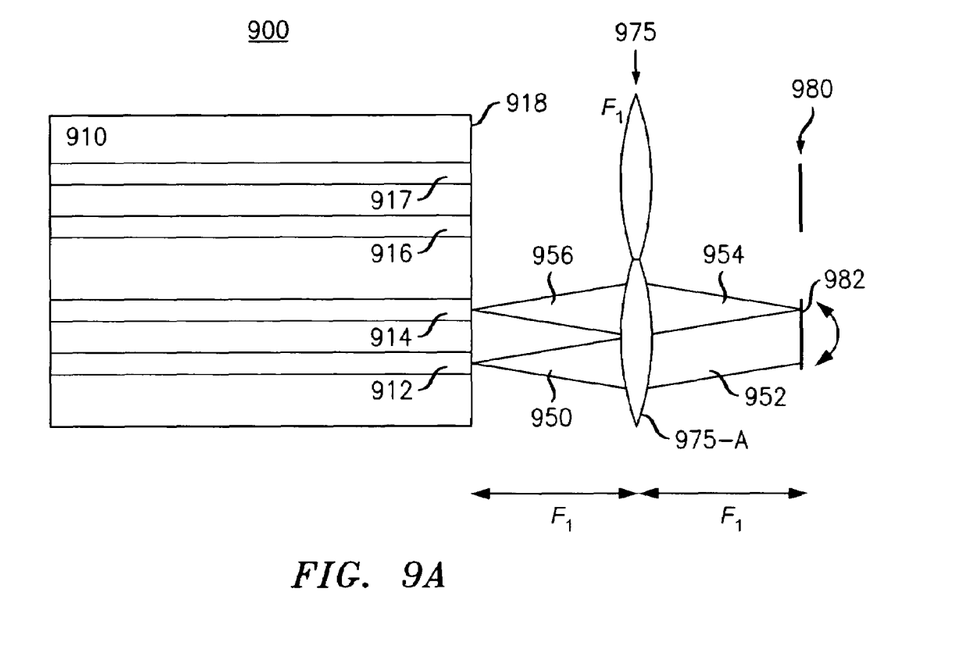
FIGS. 9a-b are top and side views of an optical switch according to another embodiment of the invention.
Figure 9B:
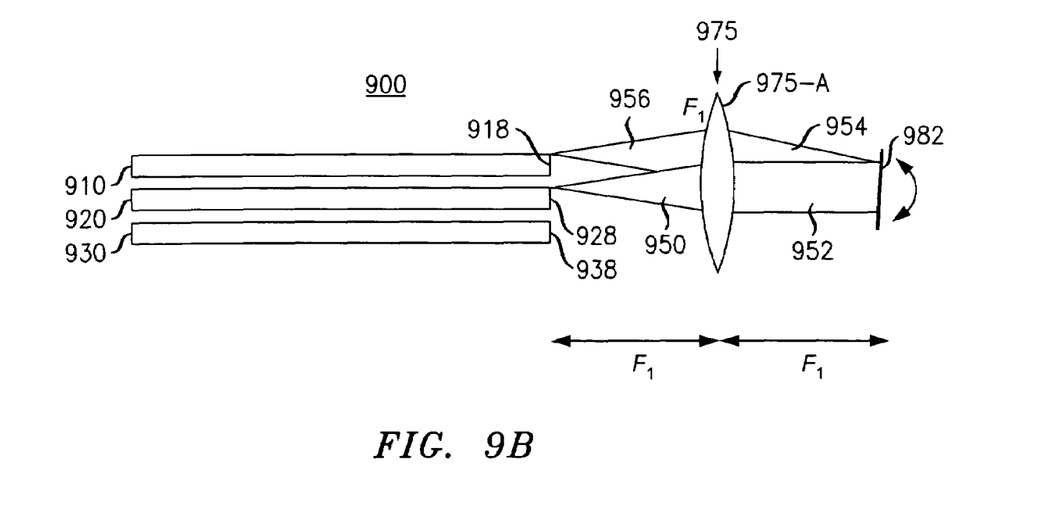

In operation, for example, a light beam 950 emitted from a waveguide on a PLC (e.g. PLC 920), radiates from the PLC and diverges in the vertical and horizontal directions. The light beam 950 passes through a lens 975a of the array of spherical lenses 975, which collimates the light beam 950 in the vertical and horizontal directions (as light beam 952). The light beam (952) strikes a micromirror 982 of the micromirror array 980. The micromirrors 982 of the micromirror array 982 can be tilted or rotated about two axes to direct beams at a desired angle and in a preferred direction. The light beam 952 is reflected and directed by the micromirror (as light beam 954) through the lens 975a, which images the light beam 956 in the vertical and horizontal directions onto the edge facet 918 of another PLC 910, and couples the light beam 956 into a waveguide 914.

Figure 10A:
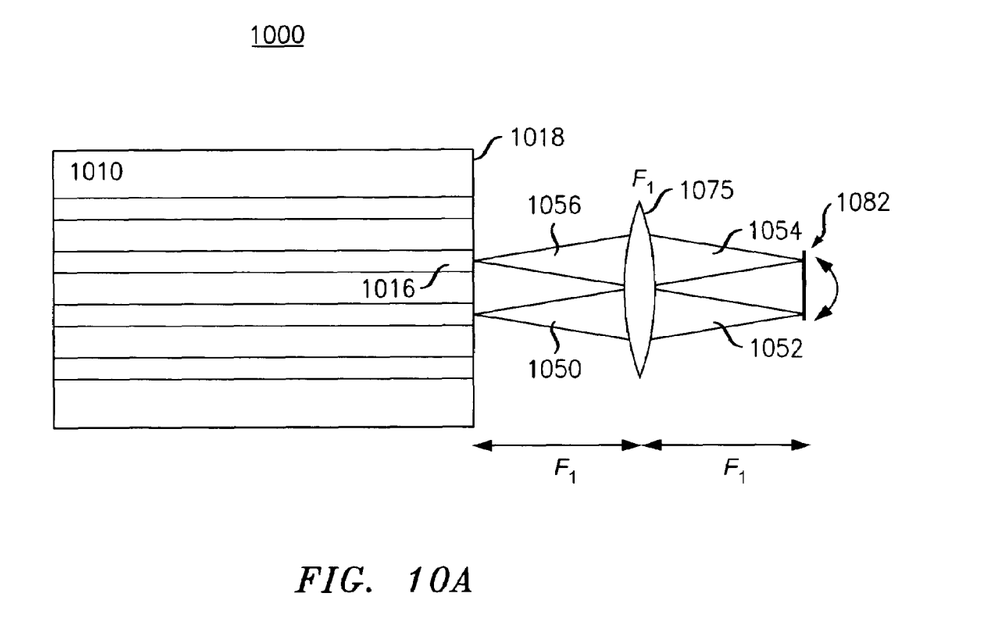
FIGS. 10a-b are top and side views of an optical switch according to another embodiment of the invention.
Figure 10B:
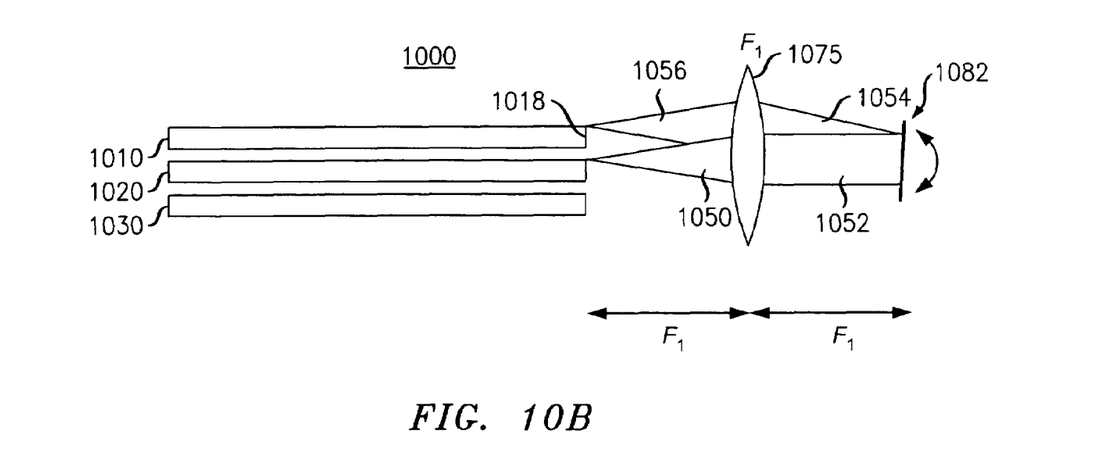

In another alternative embodiment of an optical switch 1000 according to the invention shown in FIGS. 10a-b, the array of spherical lenses 975 of the embodiment shown in FIGS. 9a-b can be replaced by a single spherical lens 1075 having an aperture covering each waveguide of the plurality of PLCs 1010, 1020, 1030, and the micromirror array 980 can be replaced by a single micromirror 1082.

In operation, for example, a light beam 1050 emitted from a waveguide on a PLC (e.g. 1020), radiates from the PLC 1020 and diverges in the vertical and horizontal directions. The light beam 1050 passes through the spherical lens 1075, which collimates the light beam 1050 in the vertical and horizontal directions (as light beam 1052). The light beam 1052 strikes the micromirror 1082, which can be tilted or rotated about two axes to direct the beam (as light beam 1054) through the lens 1075, imaging the light beam (light beam 1056) in the vertical and horizontal directions onto an edge facet 1018 of another PLC 1010 and coupling the light beam 1056 into a waveguide 1016.

It will be appreciated by those skilled in the art that an optical switch according to the present invention can function as a wavelength-selective switch by using demultiplexer/multiplexer devices on the PLCs which generate optical signals at unique wavelengths on the waveguides of the PLCs. By then controlling the coupling of light beams into selected waveguides wavelength-selective switching can be achieved.

It will also be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical switch comprising:
a plurality of planar lightwave circuits (PLCs) each including at least two waveguides terminating at an edge facet of the PLC; and
one or more lenses for imaging light beams emitted from the waveguides onto a single linear array of tilting micromirrors, said one or more lenses configured to collimate said light beams in a first direction and image said light beams in a direction different from said first direction, and each of said tilting micromirrors configured to rotate about an axis;
wherein said waveguides, said one or more lenses and a micromirror of said linear array of tilting micromirrors are configured to image a light beam emitted from one of said waveguides onto said micromirror, reflect said light beam through at least one of said one or more lenses and image said light beam onto and couple said light beam into one of said waveguides.

2. The optical switch according to claim 1, wherein the plurality of PLCs are arranged in a stack.

3. The optical switch according to claim 2, wherein at least two of the waveguides of the stacked PLCs are substantially aligned along an axis of the PLC stack.

4. The optical switch according to claim 1, wherein the one or more lenses comprises an anamorphic lens for collimating each of the light beams in a first direction, and imaging each of the light beams in a second direction orthogonal to said first direction onto a micromirror of the tilting micromirror array.

5. The optical switch according to claim 4, wherein the anamorphic lens is constructed from a spherical lens and a cylindrical lens, the anamorphic lens having a first focal length $F_1$ in a horizontal direction, and a second focal length $F_2$ in a vertical direction.

6. The optical switch according to claim 4, wherein the anamorphic lens is constructed from two crossed cylindrical lenses, the anamorphic lens having a first focal length $F_1$ in a horizontal direction, and a second focal length $F_2$ in a vertical direction.

7. The optical switch according to claim 6, wherein $2F_1 = F_2$.

8. The optical switch according to claim 6, wherein the anamorphic lens is positioned at a distance of $F_2$ from the PLCs and from the array of tilting micromirrors.

9. The optical switch according to claim 1, wherein the tilting micromirrors can be tilted about one axis.

10. The optical switch according to claim 1, wherein the tilting micromirrors can be tilted about a first axis and a second axis.

11. The optical switch according to claim 1, wherein at least one of the PLCs includes at least one multiplexer/demultiplexer device.

12. The optical switch according to claim 1, wherein the edge facet of each of the PLCs of the plurality of PLCs is contoured to control the direction of the light beams coupled into and out of each of the waveguides of the plurality of PLCs.

13. The optical switch according to claim 1, wherein the one or more lenses includes a plurality of lenses for providing normal telecentric imaging of light beams in a horizontal direction ont the micromirrors and edge facets of the plurality of PLCs, and one or more cylindrical lenses for collimating light beams emitted from the waveguides in a vertical direction.

14. The optical switch according to claim 1, wherein at least one of the waveguides of the plurality of PLCs includes a mode conversion region adjacent to the edge facet.

15. An optical switch comprising:
a plurality of planar lightwave circuits (PLCs) each including at least two waveguides terminating at an edge facet of the PLC; and
one or more cylindrical lenses configured to collimate light beams emitted from the waveguides in a first direction and image said light beams in a second direction orthogonal to said first direction onto a single linear array of tilting micromirrors, each of said tilting micromirrors configured to rotate about an axis;
wherein said waveguides, said one or more lenses and a micromirror of said linear array of tilting micromirrors are configured to image a light beam emitted from one of said waveguides onto said micromirror, reflect said light beam through at least one of said one or more lenses and couple said light beam into one of said waveguides.

16. The optical switch according to claim 15, wherein the edge facet of each PLC of the plurality of PLCs is formed with a desired profile such that light beams emitted from the waveguides have a converging mode in a horizontal direction and each light beam converges on a micromirror of the linear array of tilting micromirrors.

17. The optical switch according to claim 15, wherein the edge facet of each PLC of the plurality of PLCs is formed with a desired profile such that light beams emitted from the waveguides are collimated in a horizontal direction.

18. The optical switch according to claim 15, further comprising a plurality cylindrical lenses each lens being aligned with one of the waveguides for causing diverging light beams emitted from the waveguides to have a converging mode in a horizontal direction such that the light beams each converge on a micromirror of the linear array of tilting micromirrors.

19. An optical switch comprising:
a plurality of planar lightwave circuits (PLCs) each including at least two waveguides terminating at an edge facet of the PLC;
one or more lenses for collimating light beams emitted from the waveguides in a first direction and imaging said light beams in a second direction orthogonal to said first direction; and
one or more tilting micromirrors associated with each of the one or more lenses, each of said tilting micromirrors configured to rotate about an axis;
wherein said waveguides, said one or more lenses and a micromirror of said linear array of tilting micromirrors are configured to propagate a light beam emitted from one of said waveguides through said one or more lenses and image said light beam onto an associated tilting micromirror, reflect said light beam from said associated micromirror through at least one of said one or more lenses and couple said light beam into one of said waveguides.

20. The optical swithc according to claim 19, wherein the edge facet of each of the PLCs is contoured to control the direction of the light beams coupled into and out of each of the waveguides of the plurality of PLCs.

* * * * *